United States Patent
Haque

(10) Patent No.: US 11,734,070 B2
(45) Date of Patent: Aug. 22, 2023

(54) SYSTEMS AND METHODS FOR PROVIDING A COMPARE AND SWAP PLATFORM FOR SEQUENCE NUMBER GENERATION IN A CLOUD COMPUTING ENVIRONMENT

(71) Applicant: Verizon Patent and Licensing Inc., Arlington, VA (US)

(72) Inventor: Rezwanul Haque, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 220 days.

(21) Appl. No.: 16/688,693

(22) Filed: Nov. 19, 2019

(65) Prior Publication Data

US 2021/0149730 A1    May 20, 2021

(51) Int. Cl.
   *G06F 9/50*    (2006.01)
(52) U.S. Cl.
   CPC .................. *G06F 9/5016* (2013.01)
(58) Field of Classification Search
   CPC ..................................................... G06F 9/5016
   See application file for complete search history.

(56) References Cited

U.S. PATENT DOCUMENTS

| | | | | |
|---|---|---|---|---|
| 6,237,019 B1 * | 5/2001 | Ault | ........................... | G06F 9/52 718/107 |
| 6,859,824 B1 * | 2/2005 | Yamamoto | .............. | H04L 69/28 370/468 |
| 2002/0131423 A1 * | 9/2002 | Chan | ................... | H04L 67/1017 707/E17.12 |
| 2007/0260608 A1 * | 11/2007 | Hertzberg | ............. | G06F 9/5016 |
| 2010/0088476 A1 * | 4/2010 | Inagaki | ................... | G06F 9/526 711/152 |
| 2013/0145117 A1 * | 6/2013 | Wilkinson | .......... | G06F 11/2071 711/E12.001 |
| 2020/0100210 A1 * | 3/2020 | Vaidya | ................... | H04W 68/06 |
| 2021/0103564 A1 * | 4/2021 | Fretz | ..................... | G06F 16/148 |

OTHER PUBLICATIONS

Khatamifard et al. "On Approximate Speculative Lock Elision." IEEE Transactions on Multi-Scale Computing Systems 4.2 (2017) pp. 141-151. (Year: 2017).*

* cited by examiner

*Primary Examiner* — Meng Ai T An
*Assistant Examiner* — Willy W Huaracha

(57) ABSTRACT

A memory device may receive, from a thread, a first request to read from a location that stores a first value, and may provide, to the thread, the first value based on receiving the first request. The memory device may receive, from the thread, a second request to cause the first value to be incremented to a second value, and may determine that the first value failed to be incremented. The memory device may provide, to the thread, information indicating that the first value failed to be incremented, and may increment a counter value to generate an incremented counter value. The memory device may receive, from the thread, a third request to cause the first value to be incremented to a third value, and may attempt, when the incremented counter value fails to satisfy a threshold, to cause the first value to be incremented to the third value.

20 Claims, 16 Drawing Sheets

SYSTEMS AND METHODS FOR PROVIDING A COMPARE AND SWAP PLATFORM FOR SEQUENCE NUMBER GENERATION IN A CLOUD COMPUTING ENVIRONMENT

BACKGROUND

Multithreading is a programming and execution model that allows multiple threads to exist within a context of a single resource, such as a shared memory. The threads share the single resource, but are able to execute independently. Multithreading enables concurrent execution on the single resource, as well as parallel execution on multiple resources.

DETAILED DESCRIPTION OF PREFERRED EMBODIMENTS

Figure 1A:
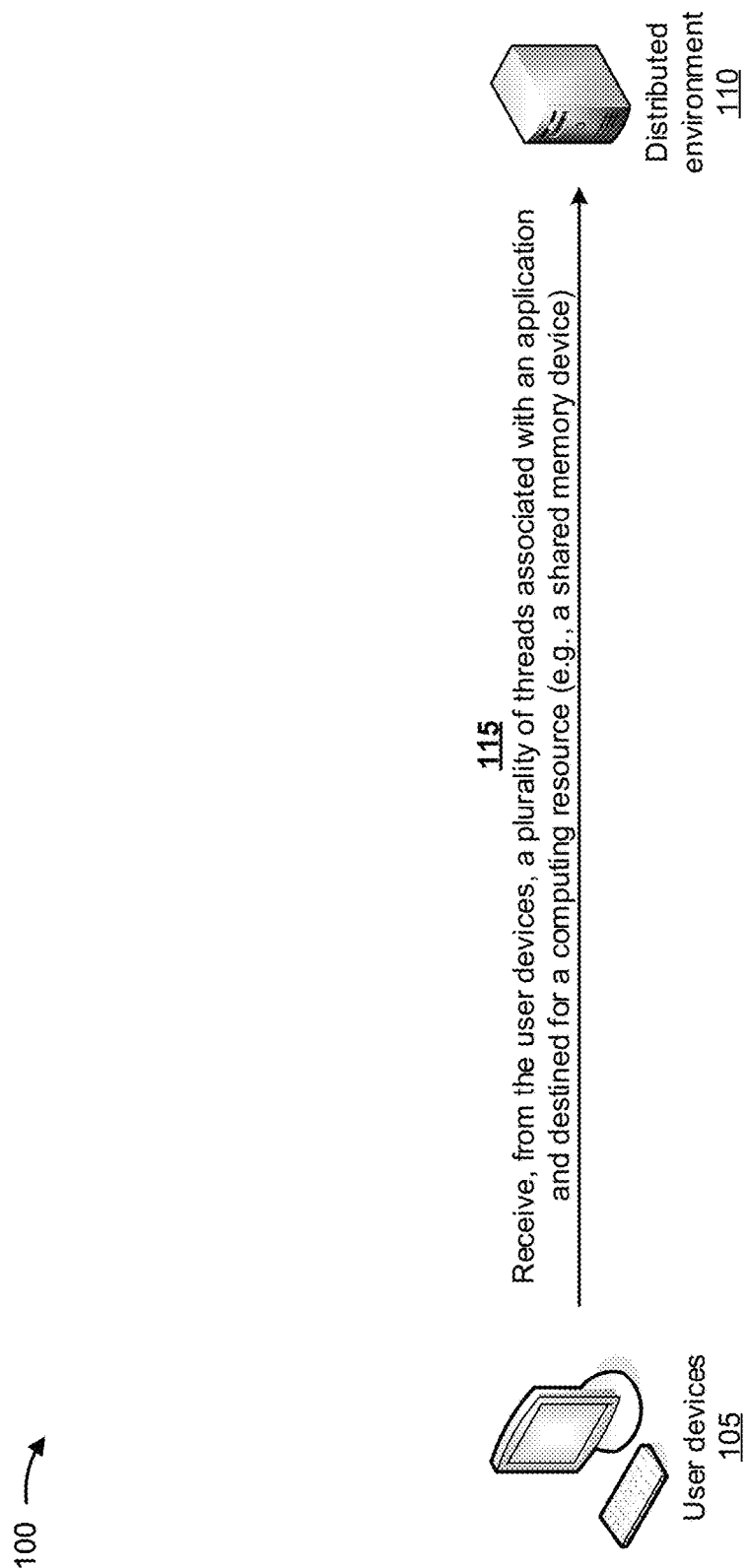
FIGS. 1A-1M are diagrams of one or more example implementations described herein.

The following detailed description of example implementations refers to the accompanying drawings. The same reference numbers in different drawings may identify the same or similar elements.

Sequence numbers are generated for a shared memory device to ensure that threads do not contend with each other when working with the shared memory device. Generating sequence numbers in concurrent computing environments is challenging since multiple threads concurrently attempt to generate and/or update sequence numbers. For example, a particular thread may update a sequence number and other threads may utilize sequence numbers that have not been updated and are therefore invalid, or lose a shared memory device update. This challenge may be addressed in a concurrent computing environment with a compare and swap model. The compare and swap model updates a value of a memory location of a shared memory device with a new value (e.g., calculated by a thread) only if the value is still the same value previously read by the thread. The compare and swap model enables only one thread to win without any locking, while other threads in contention retry with a next value calculation appropriate for the other threads.

In a cloud computing environment (e.g., a distributed computing environment), where an application may be deployed in multiple machines for redundancy, complexity in sequence number generation increases for various reasons. For example, the application may be deployed in different remote processing units. Thus, concurrent threads in contention are located not only in different processes of the application, but also in different processing units. Furthermore, since the shared resource is remote, reading a current state of the shared resource in the compare and swap model is computationally expensive. In other examples, many database management systems do not support sequence number generation, distributed lock management is more expensive and error prone in a distributed computing environment, and there are problem domains where thread contention is possible but not frequent. Thus, existing sequence number generation techniques tend to waste valuable computing resources (e.g., processing resources, memory resources, communication resources, and/or the like), networking resources, and/or the like when performing operations such as reading sequence numbers from remote shared resources, unnecessarily implementing locks, correcting errors, and/or the like.

Some implementations described herein provide a shared memory device that provides a compare and swap platform for sequence number generation in a cloud computing environment. For example, the shared memory device may receive, from a first thread of a plurality of threads, a first request to read from a location in the shared memory device. The shared memory device may be provided in a distributed cloud computing environment, and the location may store a first value at a time of receipt of the first request. The shared memory device may provide the first value to the first thread in response to the first request. The shared memory device may further receive a second request from the first thread requesting to increment the first value to a second value. In some aspects, the shared memory device may determine that the first value failed to be incremented to the second value in response to the second request, and may provide information indicating this failure to the first thread. The shared memory device may increment a counter value, based on the first value failing to be incremented to the second value, to generate an incremented counter value, and may receive, from the first thread, a third request to cause the first value, stored at the location in the shared memory device, to be incremented to a third value. The shared memory device may determine, based on receiving the third request, whether the incremented counter value satisfies a threshold, and may attempt, when the incremented counter value fails to satisfy the threshold, to cause the first value to be incremented to the third value.

In this way, the shared memory device provides a compare and swap platform for sequence number generation in a cloud computing environment. Unlike current techniques, the shared memory device provides a platform that eliminates expensive locks, can be utilized in low contention environments, is cost effective (e.g., due to elimination of remote read operations), and can be utilized with all database management systems. Thus, the shared memory device conserves computing resources, networking resources, and/or the like that would otherwise be wasted in reading sequence numbers from remote shared resources, unnecessarily implementing locks, correcting errors, and/or the like.

FIGS. 1A-1M are diagrams of one or more example implementations 100 described herein. As shown in FIG. 1A, user devices 105 may be associated with a distributed environment 110. User devices 105 may include a mobile device, a computer, a telephone, a set-top box, and/or the like that may be utilized to interact with and/or retrieve information from distributed environment 110. Distributed environment 110 may include a cloud computing environment and may provide a compare and swap platform for sequence number generation.

As further shown in FIG. 1A, and by reference number 115, distributed environment 110 may receive, from user devices 105, a plurality of threads associated with an application and to be provided to a computing resource (e.g., a shared memory device). For example, the distributed environment may provide the application to user devices 105, and interactions of user devices 105 with the application may product the plurality of threads. In some implementations, different threads, of the plurality of threads, may be associated with different user devices 105. In some implementations, user devices 105 may be remotely located (e.g., provided on different networks, provided in different geographical locations, and/or the like) from the shared memory device.

Figure 1B:
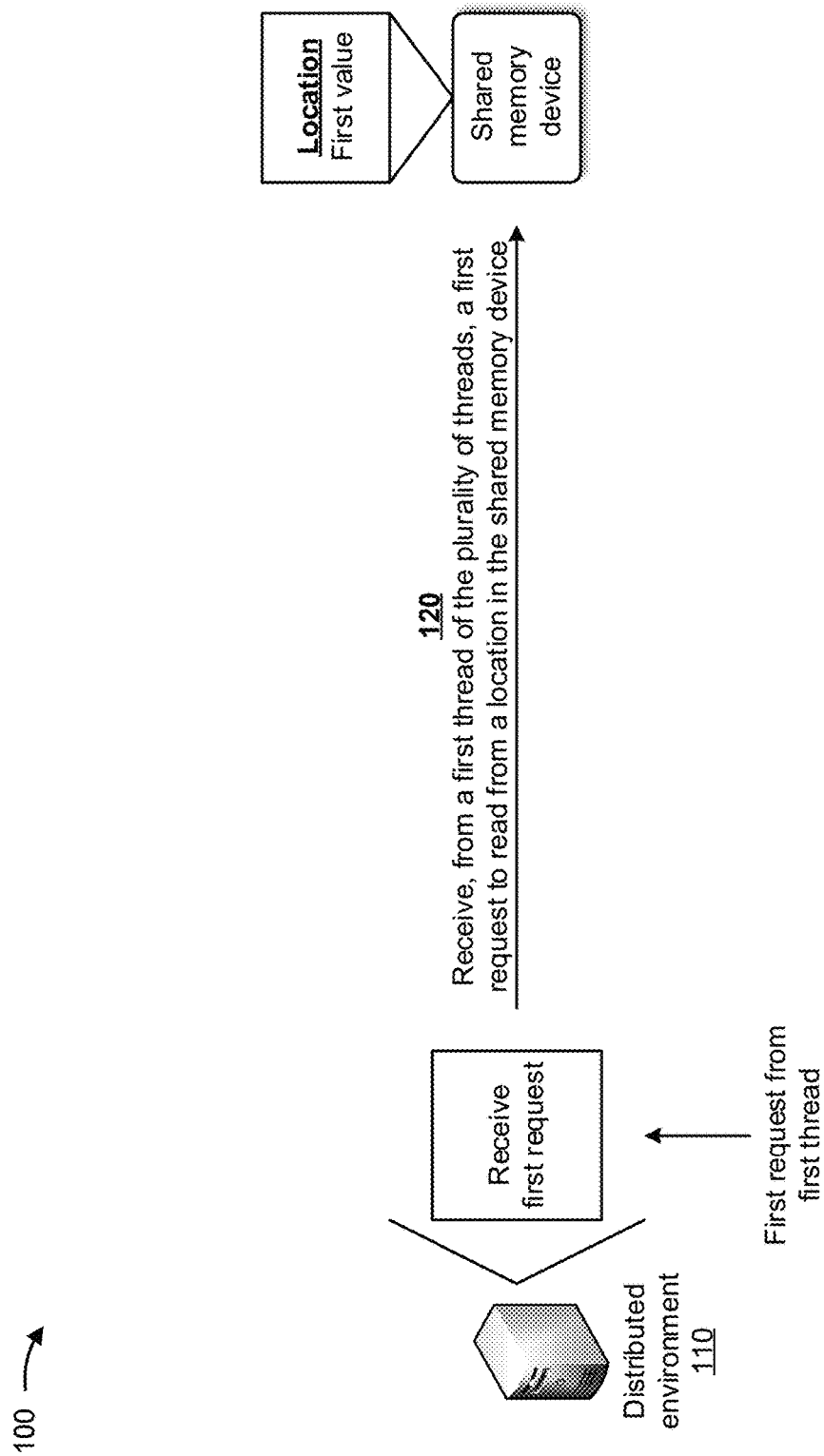

As shown in FIG. 1B, and by reference number 120, distributed environment 110 may receive, from a first thread of the plurality of threads, a first request to read from a location in the shared memory device. For example, the first thread may request distributed environment 110 to read from the location of the shared memory device that stores a sequence number associated with a sequence of execution of operations performed by the plurality of threads in distributed environment 110. The sequence number may be used to prevent multiple threads from encountering serious errors or failures (e.g., utilizing sequence numbers that have not been updated and are therefore invalid) when contending for resources of the shared memory device.

Figure 1C:
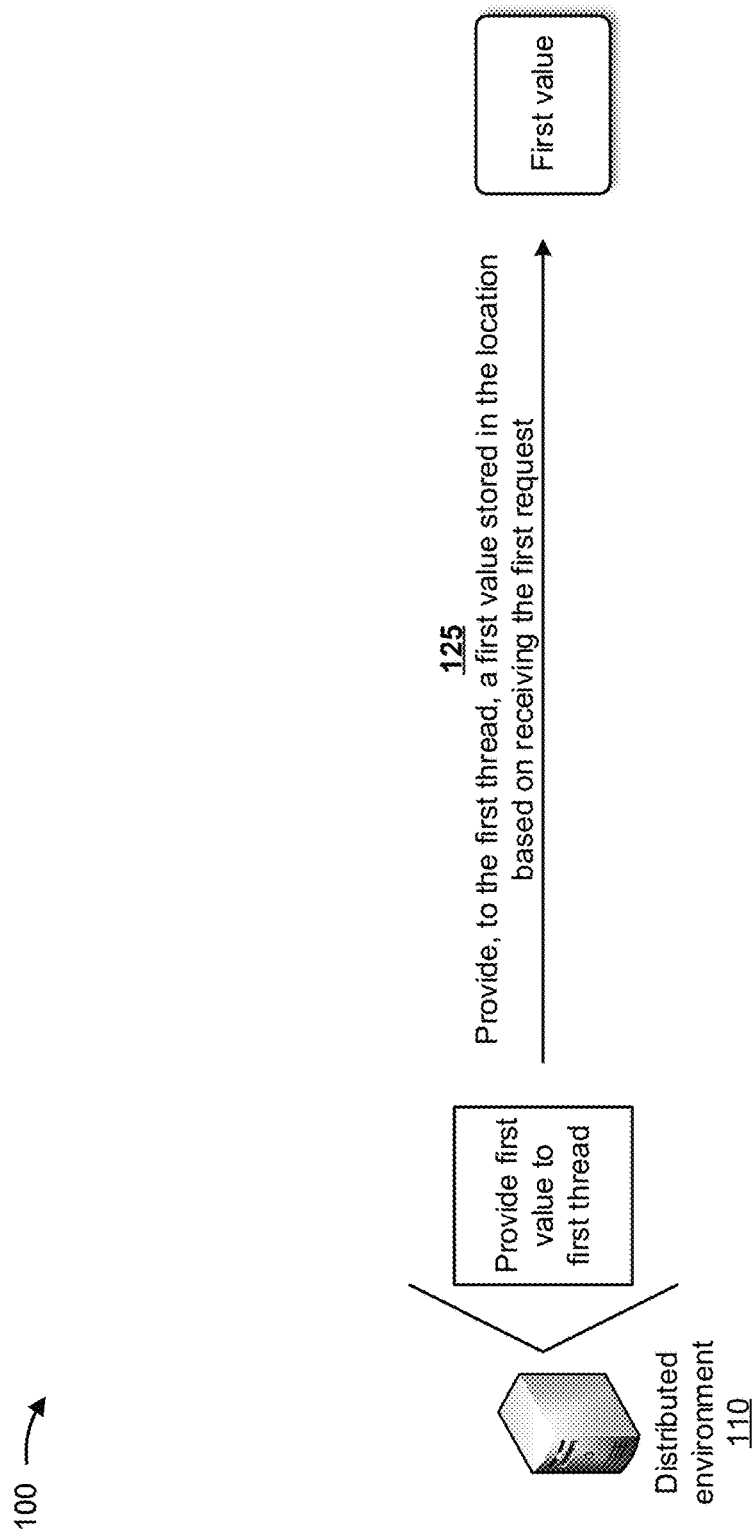

As shown in FIG. 1C, and by reference number 125, distributed environment 110 may provide a first value to the first thread in response to receiving the first request. For example, the first value may be a value that is stored in the location of the shared memory device at a time of receipt of the request. In some implementations, the first value may represent a current value, at the time of receipt of the request, of a sequence number associated with the sequence of execution of operations performed by the plurality of threads. For example, the current value of the sequence number may be a most recently loaded or updated value of the sequence number, at the time of receipt of the request, which may have been and/or may continue to be incremented based on requests received from any of the plurality of threads. The first thread may receive the first value, and may utilize the first value as a last known value of the sequence number (e.g., the value of the sequence number last known to the first thread).

Figure 1D:
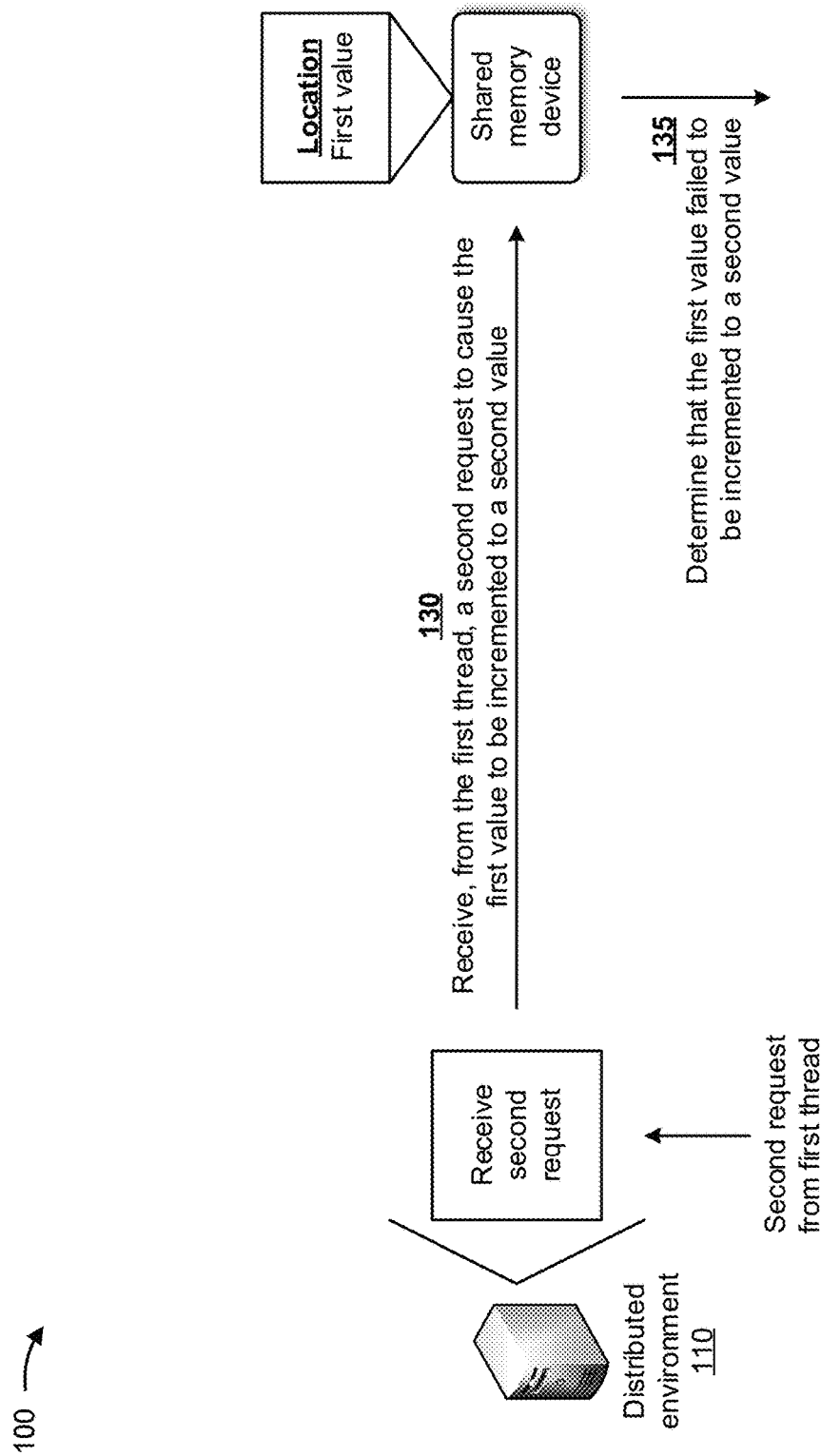

As shown in FIG. 1D, and by reference number 130, distributed environment 110 may receive, from the first thread, a second request that includes a second value to cause the first value to be incremented to the second value. For example, the first thread may request distributed environment 110 to update, to the second value, a current value of the sequence number, associated with the sequence of execution of operations performed by the plurality of threads, in the location of the shared memory device. In some aspects, the second request does not include the second value, but the first thread may determine the second value to be a next expected value of the sequence number based on what the first thread determines be the current value of the sequence number. For example, upon receiving the first value stored in the location of the shared memory device, at the time of the first request (e.g., as described above in connection with FIG. 1C), the first thread may determine the next expected value to be equal to one more than the first value since the first thread determines the first value to be the current value of the sequence number.

As further shown in FIG. 1D, and by reference number 135, distributed environment 110 may determine that the first value failed to be incremented to a second value. For example, a request, by a particular thread, for distributed environment 110 to increment the sequence number may fail because the current value of the sequence number stored in the location in the shared memory device may not be consistent with the last known value of the sequence number locally maintained by the particular thread. This may occur, for example, if a different thread caused distributed environment 110 to update the sequence number stored in the location in the shared memory device since the last time the particular thread caused distributed environment 110 to read the sequence number from the shared memory device. For this reason, distributed environment 110 may only increment the sequence number to a new value requested by the particular thread if incrementing the current value of the sequence number stored in the location of the shared memory will result in the same value as the requested new value. For example, if sequence numbers are incremented in increments of one, distributed environment 110 may only increment the sequence number in the location in the shared memory device if the current value of the sequence number stored in the location in the shared memory device is one less than a requested new value.

In this case, distributed environment 110 may determine that the first value failed to be incremented because the second value is not one more than the current value of the sequence number stored in the location of the shared memory. As a result, the current value of the sequence number stored in the location of the shared memory is not incremented based on the second request from the first thread. For example, a different thread may have caused distributed environment 110 to increment the current value of the sequence number stored in the location since the first thread last caused distributed environment 110 to read the sequence number and provide the sequence number to the first thread.

Figure 1E:
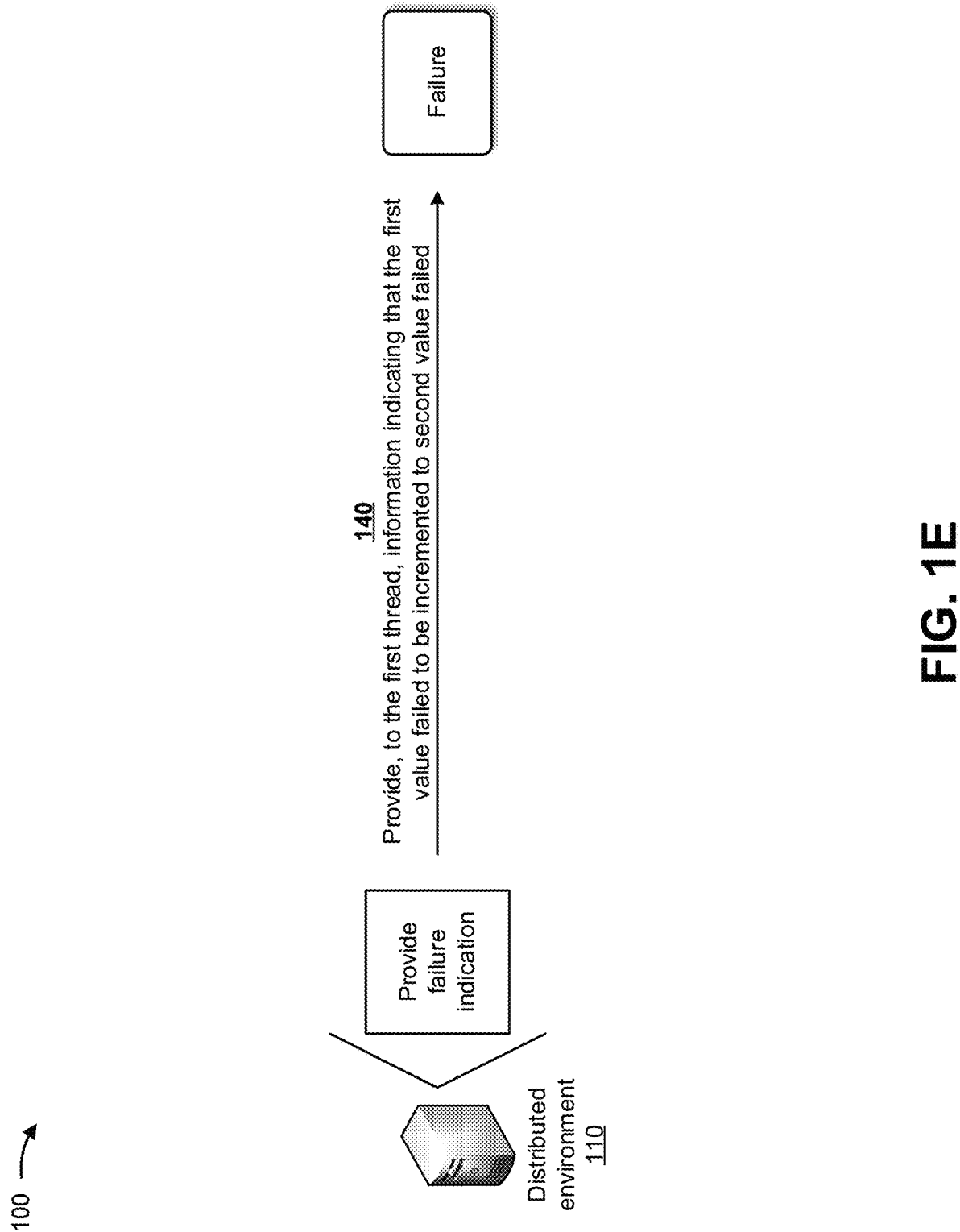

As shown in FIG. 1E, and by reference number 140, distributed environment 110 may provide, to the first thread, information indicating that the first value failed to be incremented to the second value. In this way, the first thread may determine not to perform operations that depend on the sequence number until a correct sequence number has been obtained by the first thread. Additionally, the first thread may determine that additional measures are necessary to obtain or update the sequence number based on receiving the information indicating that the first value failed to be incremented to the second value.

Figure 1F:
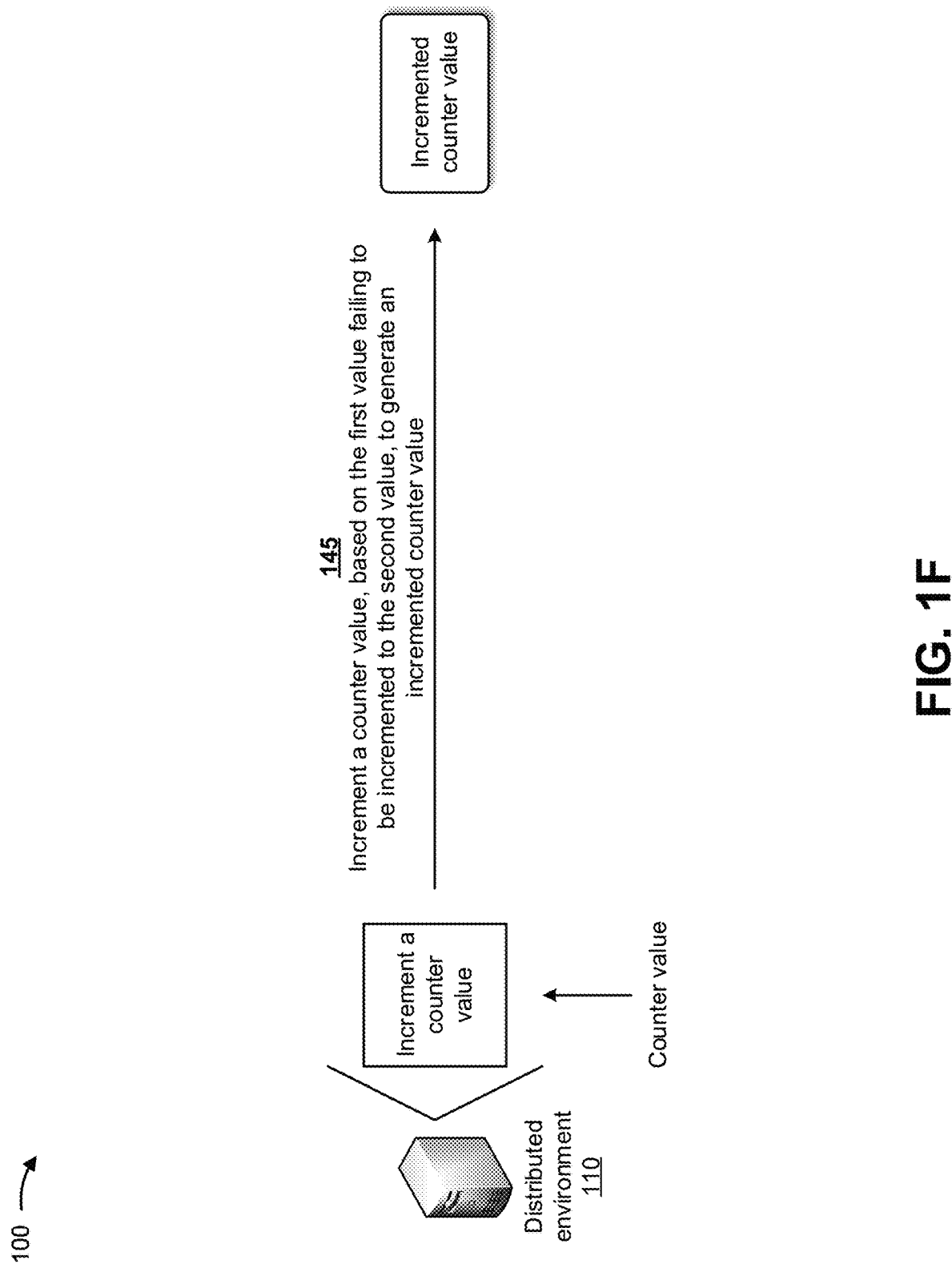

As shown in FIG. 1F, and by reference number 145, distributed environment 110 may increment a counter value, based on the first value failing to be incremented to the second value, to generate an incremented counter value. The counter value may represent a quantity of attempts that have been made to increment the sequence number without successfully incrementing the sequence number. The counter value may be utilized to limit a quantity of attempts to increment the sequence number before determining that distributed environment 110 should read the sequence number from the shared memory location and provide the sequence number to the first thread. In some implementations, the counter value may correspond specifically to the first thread, and may represent the quantity of attempts made by the first thread to increment the sequence number. In this case, a different counter value may be provided for each different thread, of the plurality of threads, when each different thread attempts to increment the sequence number.

Figure 1G:
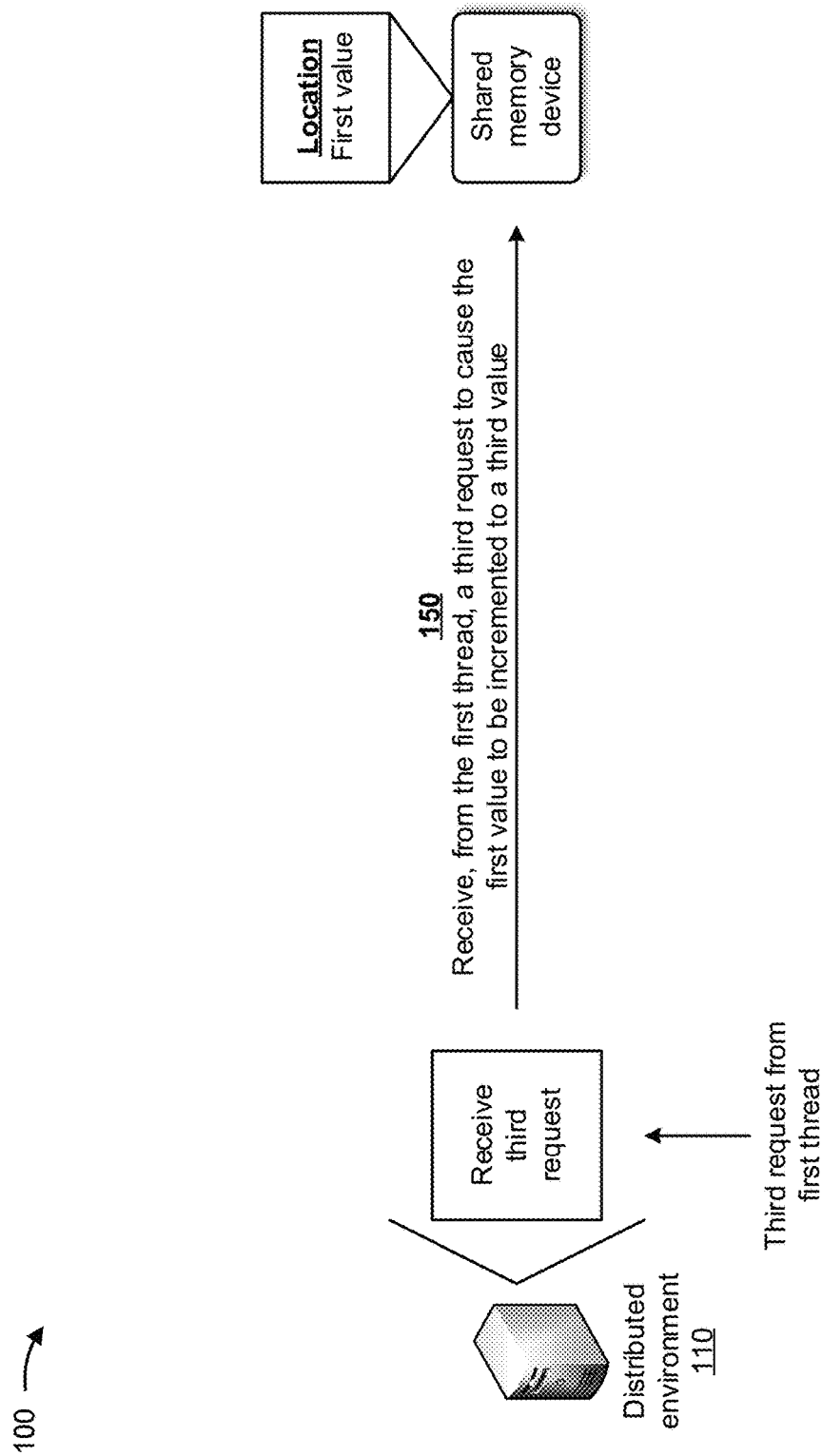

As shown in FIG. 1G, and by reference number 150, distributed environment 110 may receive, from the first thread, a third request to cause the first value to be incremented to a third value. For example, the first thread may request distributed environment 110 to update, to the third value, the current value of the sequence number in the location of the shared memory device. The first thread may determine the third value based on what the first thread determines be the current value of the sequence number. For example, upon receiving information indicating that the first value failed to be incremented to the second value, the first thread may determine the next expected value to be equal to one more than the second value since the first thread determines the second value to be the current value of the sequence number. In this case, the first thread may increment the next expected value from the second value to the third value, and may provide the third value in the third request.

Figure 1H:
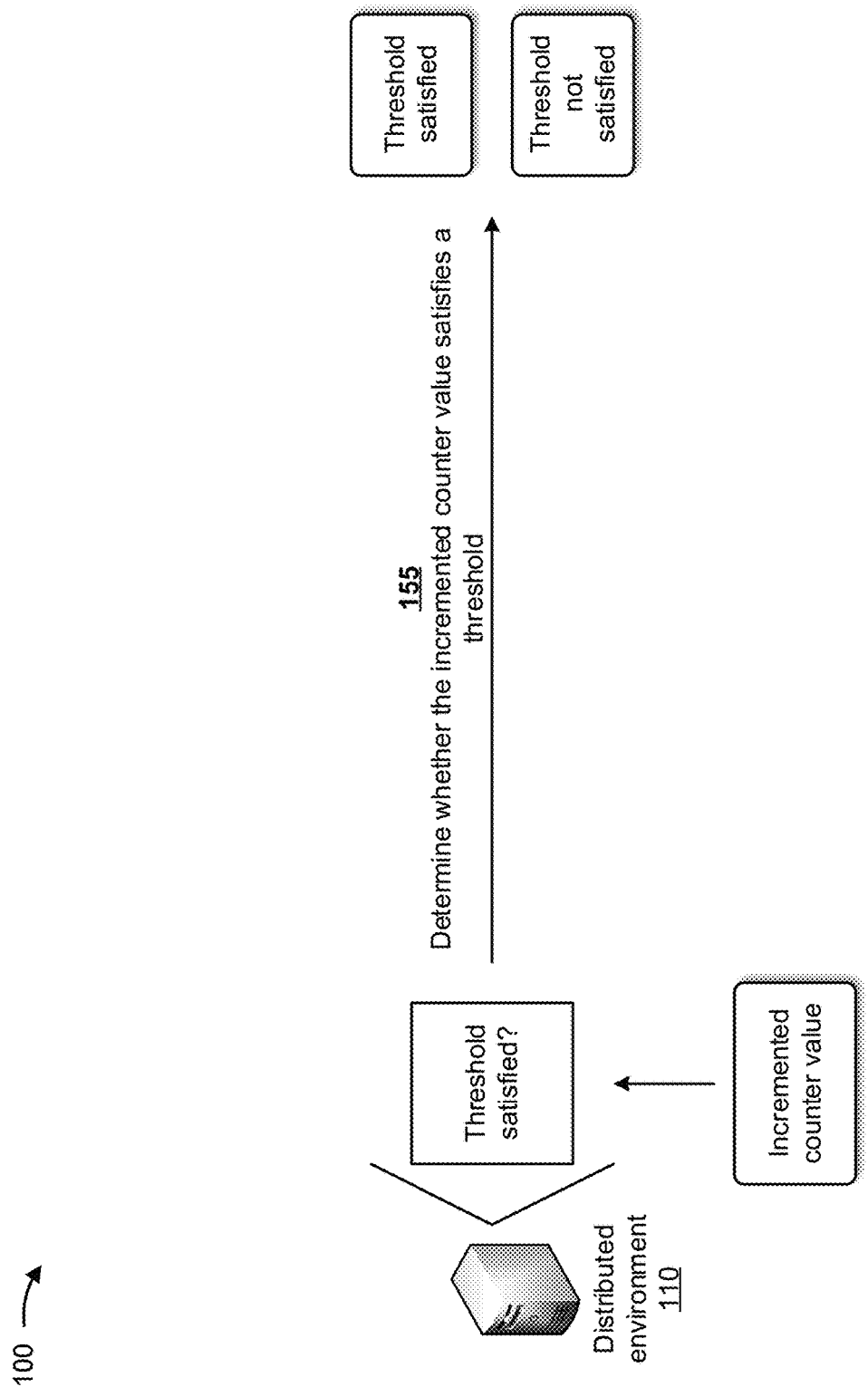

As shown in FIG. 1H, and by reference number 155, distributed environment 110 may determine whether the incremented counter value satisfies a threshold. As explained above, the counter value may be utilized to limit a quantity of attempts, by the first thread, to increment the sequence number before determining that distributed environment 110 should read the sequence number from the shared memory location and provide the sequence number to the first thread. For example, distributed environment 110 may limit the quantity of attempts to increment the sequence number to the quantity indicated by the threshold. In some implementations, the threshold may include a maximum quantity of attempts to be permitted by a current thread to increment a value stored at the location in the shared memory device. In some implementations, the threshold may be configurable based on a contention rate associated with the plurality of threads and a quantity of the plurality of threads. For example, the threshold may increase when a contention rate associated with the plurality of threads increases and a quantity of the plurality of threads decreases. Additionally, or alternatively, the threshold may decrease when a contention rate associated with the plurality of threads decreases and a quantity of the plurality of threads increases. In this way, distributed environment 110 conserves resources (e.g., computing resources, networking resources, and/or the like) that would otherwise be wasted repeatedly attempting to increment the value stored at the location in the shared memory.

In some implementations, distributed environment 110 may utilize a read counter value that represents a quantity of attempts made by a particular thread to read the value of the sequence number stored at the location in the shared memory device. Distributed environment 110 may also utilize a read counter threshold that represents a maximum quantity of attempts to be permitted by the particular thread to read the value of the sequence number stored at the location in the shared memory device. The read counter threshold may be configurable so as to limit the quantity of read attempts by a particular thread. In this way, distributed environment 110 conserves resources (e.g., computing resources, networking resources, and/or the like) that would otherwise be wasted continuously attempting to read the value stored at the location in the shared memory.

Figure 1I:
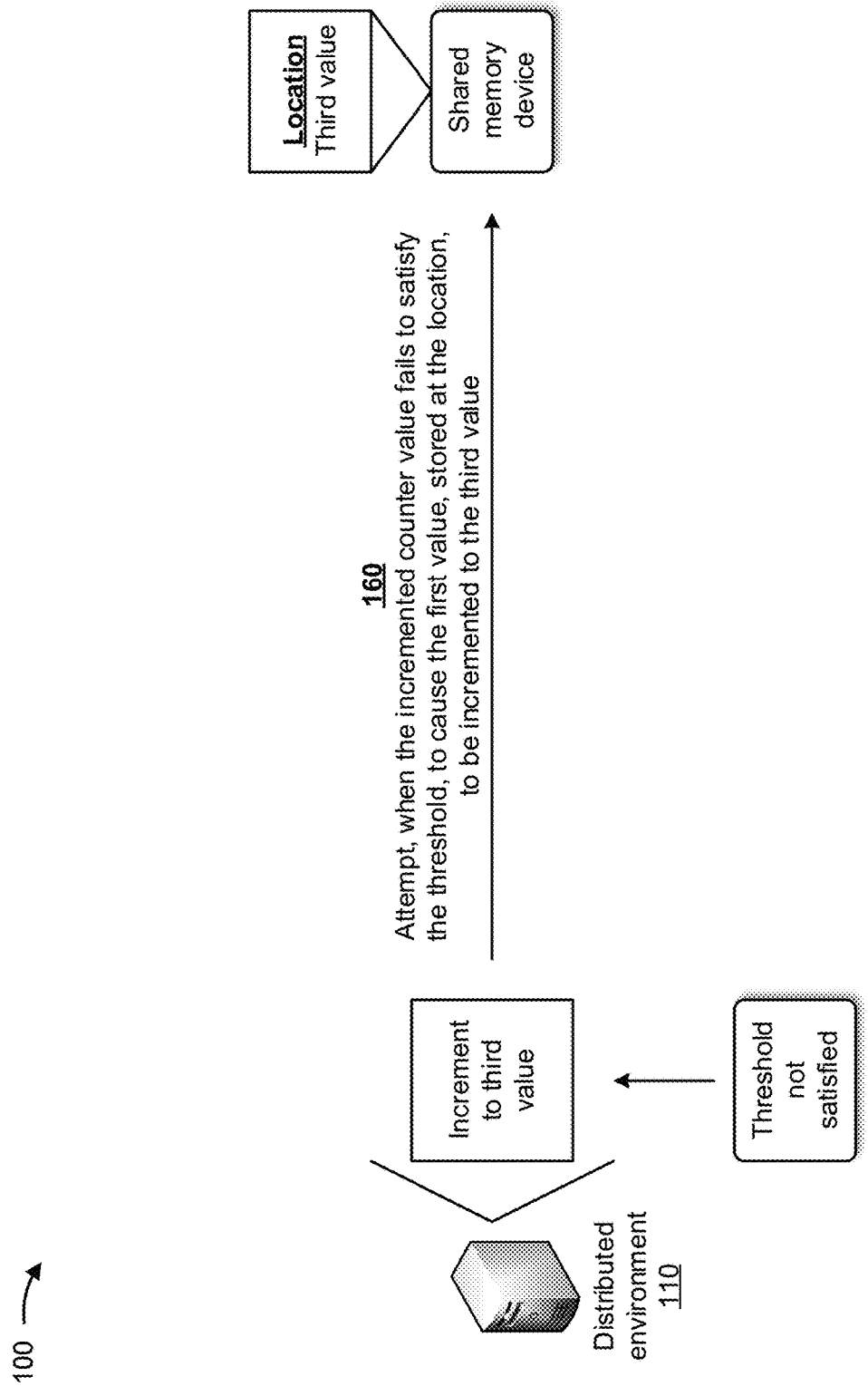

As shown in FIG. 1I, and by reference number 160, distributed environment 110 may attempt, when the incremented counter value fails to satisfy the threshold, to cause the first value, stored at the location, to be incremented to the third value. For example, distributed environment 110 may attempt to cause the current value to be incremented to the third value when the quantity of attempts to increment the sequence number has not reached a limit defined by the threshold. In this way, the first thread may continue to attempt to increment the value stored at the location of the shared memory device, until the threshold is satisfied, without having to read the value stored at the location.

Figure 1J:
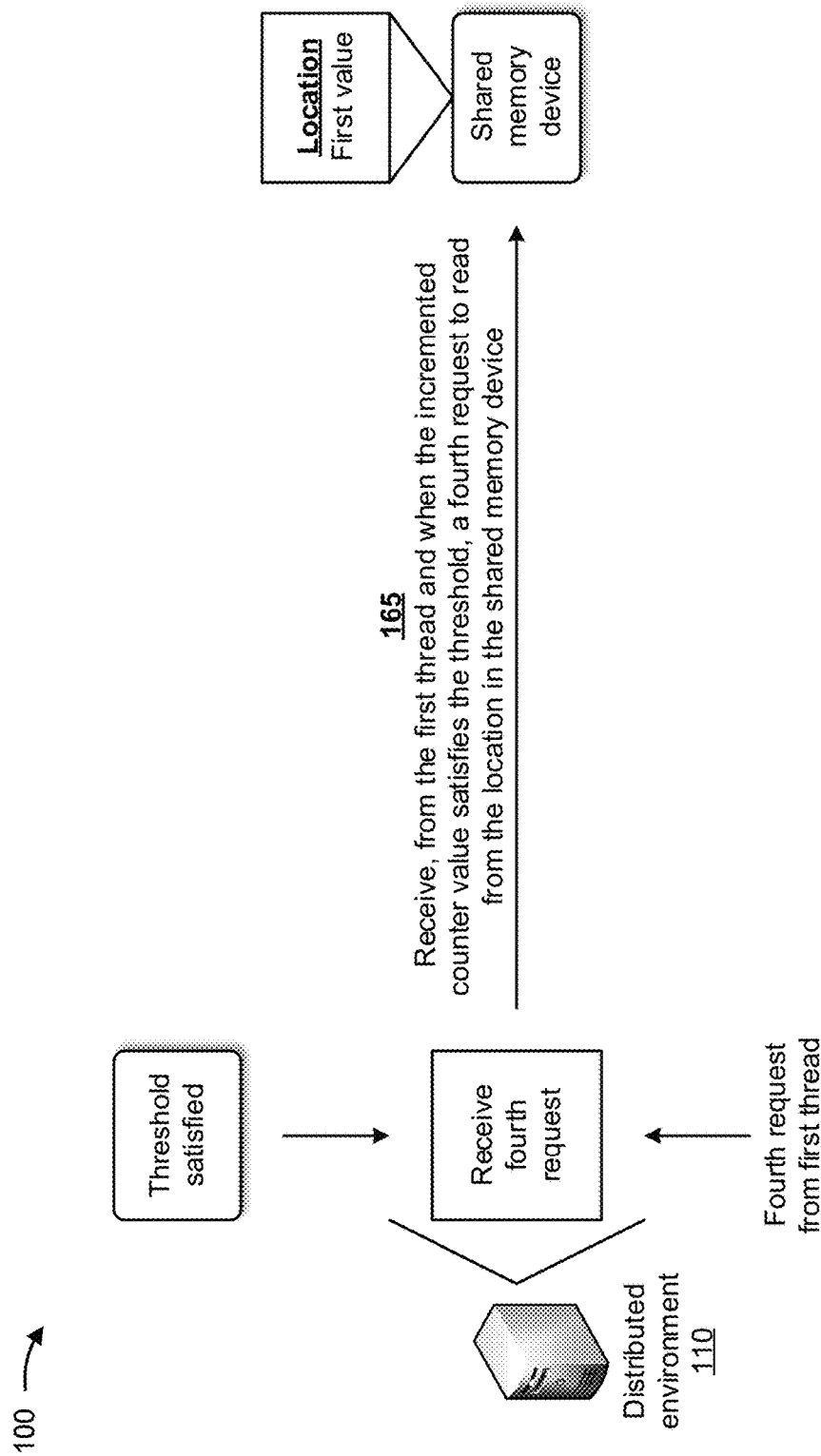

As shown in FIG. 1J, and by reference number 165, distributed environment 110 may receive, from the first thread and when the incremented counter value satisfies the threshold, a fourth request to read from the location in the shared memory device. For example, distributed environment 110 may not attempt to cause the value stored at the location to be incremented if the quantity of attempts to increment the value has reached the limit defined by the threshold. In this case, distributed environment 110 may read a current value from the location in the shared memory device and may provide the current value to the first thread. Upon receiving the current value, the first thread may utilize a next expected value based on the current value. In some implementations, distributed environment 110 may reset the counter value to zero once the counter value satisfies the threshold.

Figure 1K:
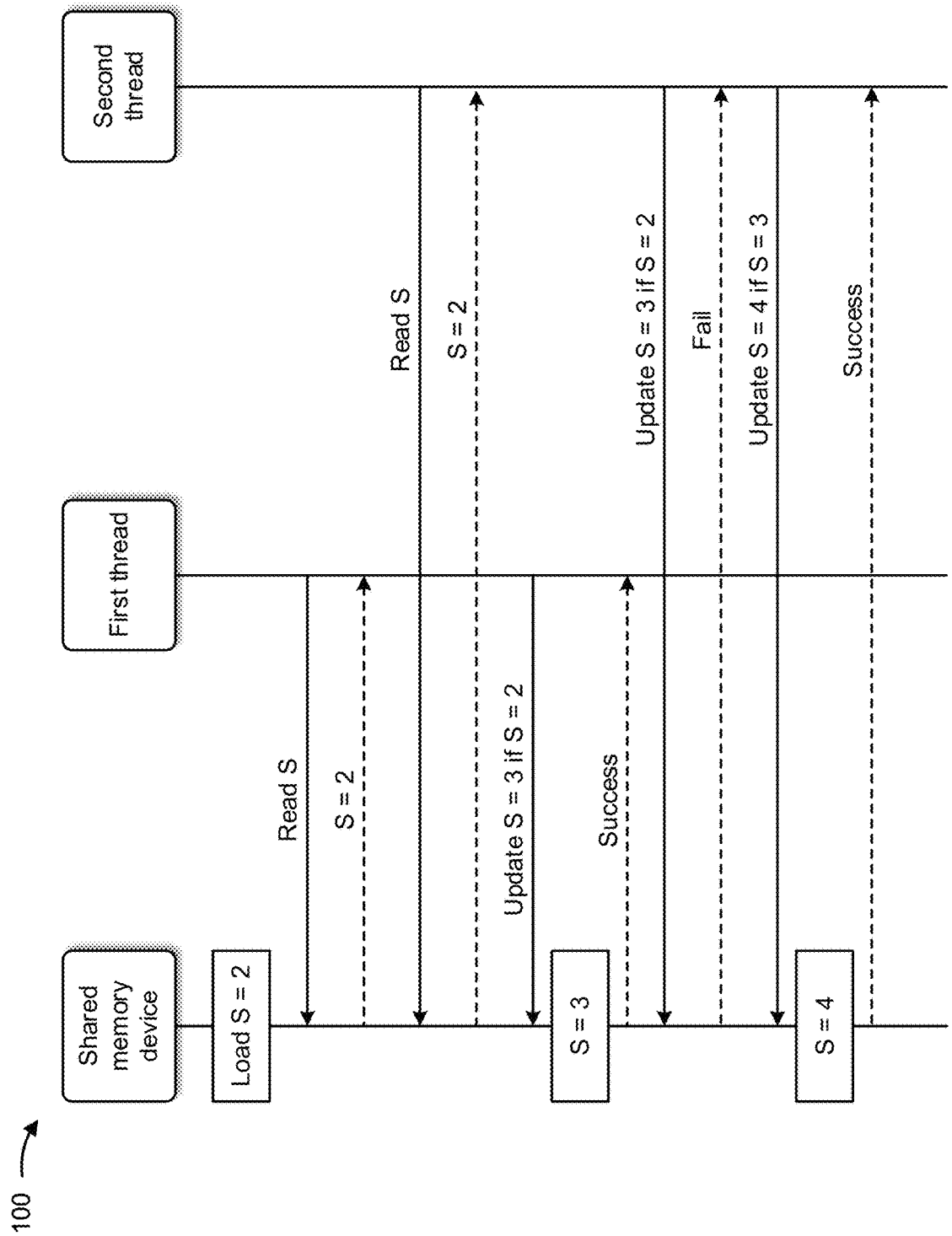

FIG. 1K shows an example sequence of operations between a shared memory device in distributed environment 110 and a first thread and second thread that utilize the shared memory device. In FIG. 1K, sequence numbers may be incremented in increments of one. As shown, the shared memory device may initially assign a current value of two (2) to a sequence number (S) in a location of the shared memory device. Thereafter, the first thread may provide, to the shared memory device, a request to read the current value, and may receive the value of two from the shared memory device. The first thread may utilize the value of two, as a last known value of the sequence number, when determining a next expected value for the sequence number. Thereafter, the second thread may provide a request to the shared memory device to read the current value, and may receive the value of two from the shared memory device. The second thread may utilize the value of two as a last known value of the sequence number when determining a next expected value for the sequence number.

As further shown in FIG. 1K, the first thread may increment the next expected value to three and may provide, to the shared memory device, a request to update the sequence number to the next expected value of three. The shared memory device may determine that the current value in the location of the shared memory device is one less than the next expected value of three provided by the first thread, may update the current value of the sequence number from two to three, and may provide an indication that the update was successful to the first thread. The first thread may update the last known value of the sequence number to three based on the indication.

As further shown in FIG. 1K, the second thread may provide, to the shared memory device, a request to update the sequence number to the next expected value of three. The shared memory device may determine that the current value in the location of the shared memory device is not one less than the next expected value of three provided by the second thread, may not update the current value of the sequence number from two to three, and may provide, to the second thread, an indication that the update failed. Thereafter, the second thread may increment the next expected value to four and provide a request to the shared memory device to update the sequence number to the next expected value of four. The shared memory device may determine that the current value in the location of the shared memory device is one less than the next expected value of four provided by the second thread, may update the current value of the sequence number from three to four, and may provide, to the second thread, an indication that the update was successful. The second thread may update the last known value of the sequence number to four based on the indication.

Figure 1L:
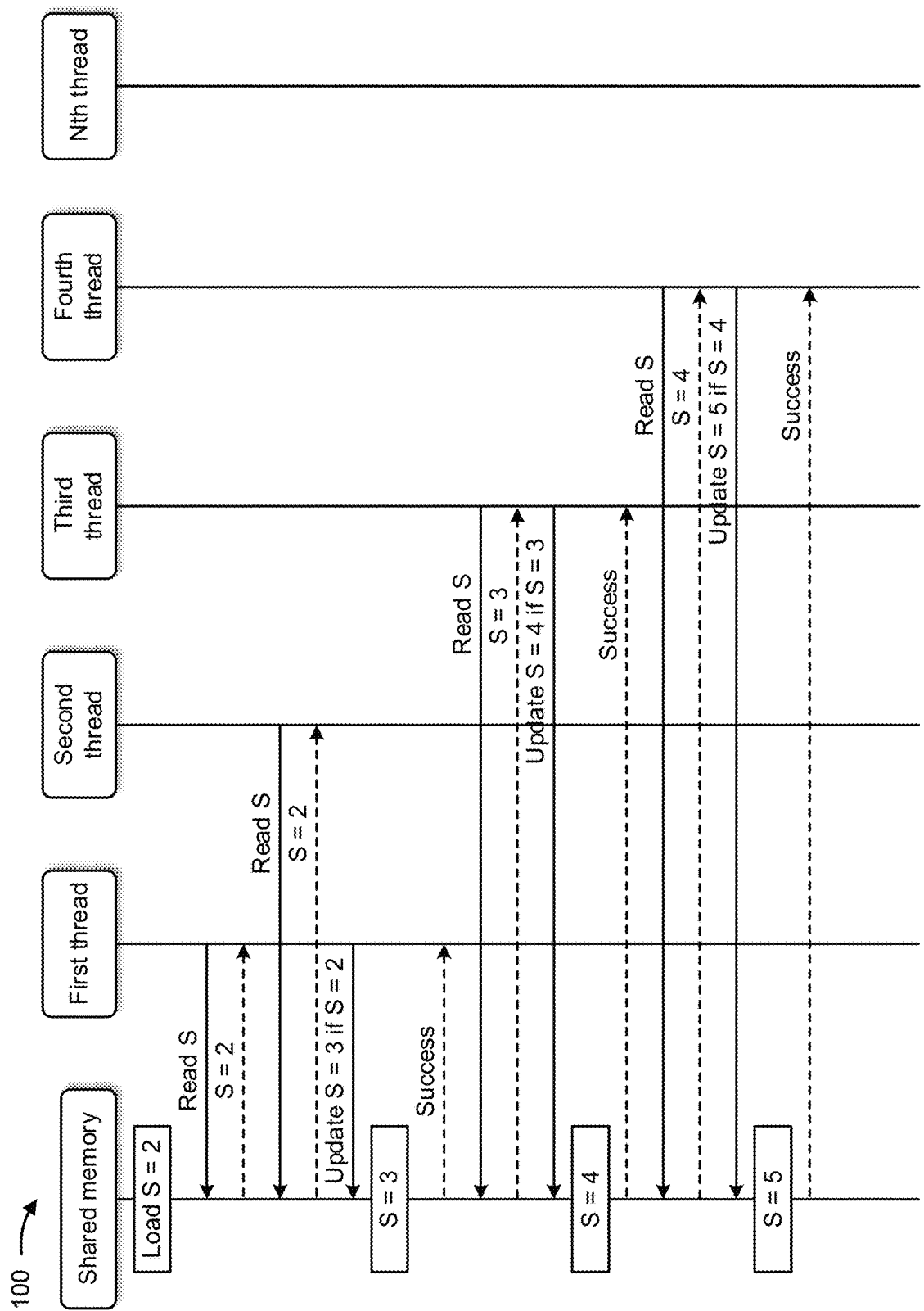
Figure 1M:
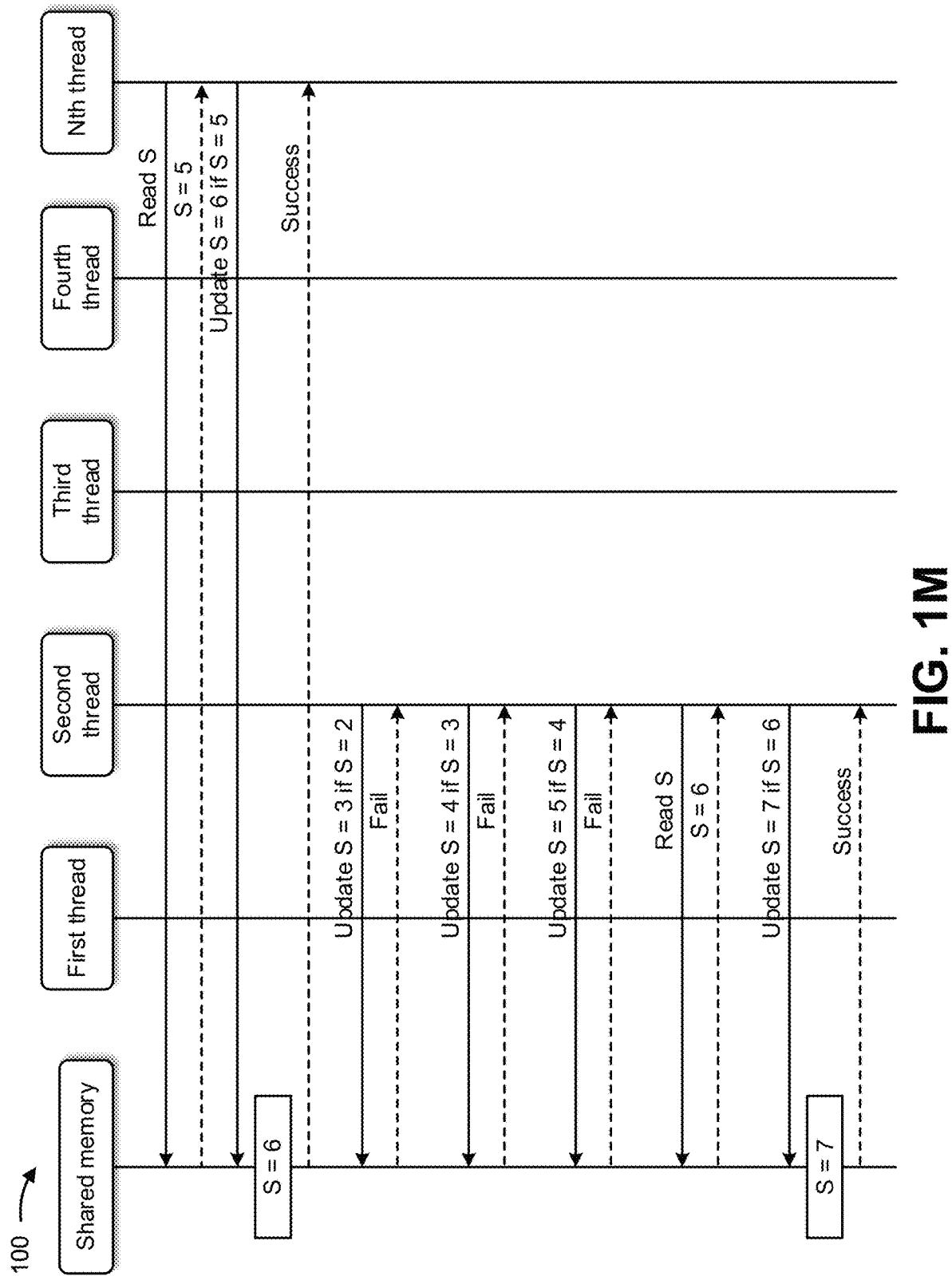

FIGS. 1L and 1M show an example sequence of operations between the shared memory device of distributed environment 110, a first thread, a second thread, a third thread, a fourth thread, and an Nth thread that utilize the shared memory device. In FIGS. 1L and 1M, sequence numbers may be incremented in increments of one. As shown in FIG. 1L, the shared memory device may initially load a sequence number (S) value of two in the location of the shared memory device. Thereafter, the first thread may provide, to the shared memory device, a request to read the current value, and may receive the value of two from the shared memory device. The first thread may utilize the value of two, as a last known value of the sequence number, when determining a next expected value for the sequence number. Thereafter, the second thread may provide, to the shared memory device, a request to read the current value, and may receive the value of two from the shared memory device. The second thread may utilize the value of two, as a last known value of the sequence number, when determining a next expected value for the sequence number.

As further shown in FIG. 1L, the first thread may increment the next expected value to three and may provide, to the shared memory device, a request to update the sequence number to the next expected value of three. The shared memory device may determine that the current value in the location of the shared memory device is one less than the next expected value of three provided by the first thread, may update the current value of the sequence number from two to three, and may provide an indication that the update was successful to the first thread. The first thread may update the last known value of the sequence number to three based on the indication.

As further shown in FIG. 1L, the third thread may provide, to the shared memory device, a request to read the current value, and may receive the value of three from the shared memory device. The third thread may utilize the value of three, as a last known value of the sequence number, when determining a next expected value for the sequence number. Thereafter, the third thread may increment the next expected value to four and may provide, to the shared memory device, a request to update the sequence number to the next expected value of four. The shared memory device may determine that the current value in the location of the shared memory device is one less than the next expected value of four provided by the third thread, may update the current value of the sequence number from three to four, and may provide, to the third thread, an indication that the update was successful. The third thread may update the last known value of the sequence number to four based on the indication.

As further shown in FIG. 1L, the fourth thread may provide, to the shared memory device, a request to read the current value, and may receive the value of four from the shared memory device. The fourth thread may utilize the value of four, as a last known value of the sequence number, when determining a next expected value for the sequence number. Thereafter, the fourth thread may increment the next expected value to five and may provide, to the shared memory device, a request to update the sequence number to the next expected value of five. The shared memory device may determine that the current value in the location of the shared memory device is one less than the next expected value of five provided by the fourth thread, may update the current value of the sequence number from four to five, and may provide, to the fourth thread, an indication that the update was successful. The fourth thread may update the last known value of the sequence number to five based on the indication.

As shown in FIG. 1M, and continuing the sequence of operations from FIG. 1L, the Nth thread may provide, to the shared memory device, a request to read the current value, and may receive the value of five from the shared memory device. The Nth thread may utilize the value of five, as a last known value of the sequence number, when determining a next expected value for the sequence number. Thereafter, the Nth thread may increment the next expected value to six and may provide, to the shared memory device, a request to update the sequence number to the next expected value of six. The shared memory device may determine that the current value in the location of the shared memory device is one less than the next expected value of six provided by the Nth thread, may update the current value of the sequence number from five to six, and may provide, to the Nth thread, an indication that the update was successful. The Nth thread may update the last known value of the sequence number to six based on the indication.

As further shown in FIG. 1M, since the second thread provided, to the shared memory device, the request to read the current value of the sequence number and received the value of two from the shared memory device, the second thread may attempt to increment the next expected value to three. The second thread may provide, to the shared memory device, a request to update the sequence number to the next expected value of three. The shared memory may determine that the current value in the location of the shared memory device is not one less than the next expected value of three provided by the second thread, may not update the current value of the sequence number to three, and may provide, to the second thread, an indication that the update failed.

As further shown in FIG. 1M, the second thread may attempt to increment the next expected value to four, and may provide, to the shared memory device, a request to update the sequence number to the next expected value of four. The shared memory may determine that the current value in the location of the shared memory device is not one less than the next expected value of four provided by the second thread, may not update the current value of the sequence number to four, and may provide, to the second thread, an indication that the update failed.

Similarly, the second thread may attempt to increment the next expected value to five, and may provide, to the shared memory device, a request to update the sequence number to the next expected value of five. The shared memory may determine that the current value in the location of the shared memory device is not one less than the next expected value of five provided by the second thread, may not update the current value of the sequence number to five, and may provide, to the second thread, an indication that the update failed. At this point, the counter threshold may be reached, and the second thread may provide, to the shared memory device, a request to read the current value. The second thread may receive the value of six from the shared memory device, and may utilize the value of six, as a last known value of the sequence number, when determining a next expected value for the sequence number.

As further shown in FIG. 1M, the second thread may increment the next expected value to seven and may provide, to the shared memory device, a request to update the sequence number to the next expected value of seven. The shared memory device may determine that the current value in the location of the shared memory device is one less than the next expected value of seven provided by the second thread, may update the current value of the sequence number from six to seven, and may provide, to the second thread, an indication that the update was successful. The second thread may update the last known value of the sequence number to seven based on the indication.

In this way, several different stages of the process for generating sequence numbers may be provided by a compare and swap platform in a cloud computing environment, which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that provides a compare and swap platform for sequence number generation in a cloud computing environment in the manner described herein. Finally, the process for generating sequence numbers with the compare and swap platform conserves computing resources, networking resources, and/or the like that would otherwise be wasted in reading sequence numbers from remote shared resources, unnecessarily implementing locks, correcting errors, and/or the like.

For example, by employing an optimistic approach that estimates potential next sequence values a quantity of times before resorting to performing remote read operations, implementations described herein conserve resources that would otherwise be wasted performing several unnecessary remote read operations. Additionally, because the quantity of estimates for potential next sequence values is limited to a maximum quantity, remote read operations may still be utilized when necessary to obtain a correct sequence number within a particular amount of time. Furthermore, by making the maximum quantity configurable, implementations described herein allow for optimal approaches to be employed based on factors such as contention rate, quantity of threads, and/or the like. By providing a solution to thread contention that does not require locking, implementations described herein may prevent errors and/or failures that may result from deadlocks, live locks, employing distributed lock management software, and/or the like.

As indicated above, FIGS. 1A-1M are provided merely as examples. Other examples may differ from what is described with regard to FIGS. 1A-1M. The number and arrangement of devices and networks shown in FIGS. 1A-1M are provided as an example. In practice, there may be additional devices and/or networks, fewer devices and/or networks, different devices and/or networks, or differently arranged devices and/or networks than those shown in FIGS. 1A-1M. Furthermore, two or more devices shown in FIGS. 1A-1M may be implemented within a single device, or a single device shown in FIGS. 1A-1M may be implemented as multiple, distributed devices. Additionally, or alternatively, a set of devices (e.g., one or more devices) of FIGS. 1A-1M may perform one or more functions described as being performed by another set of devices of FIGS. 1A-1M.

Figure 2:
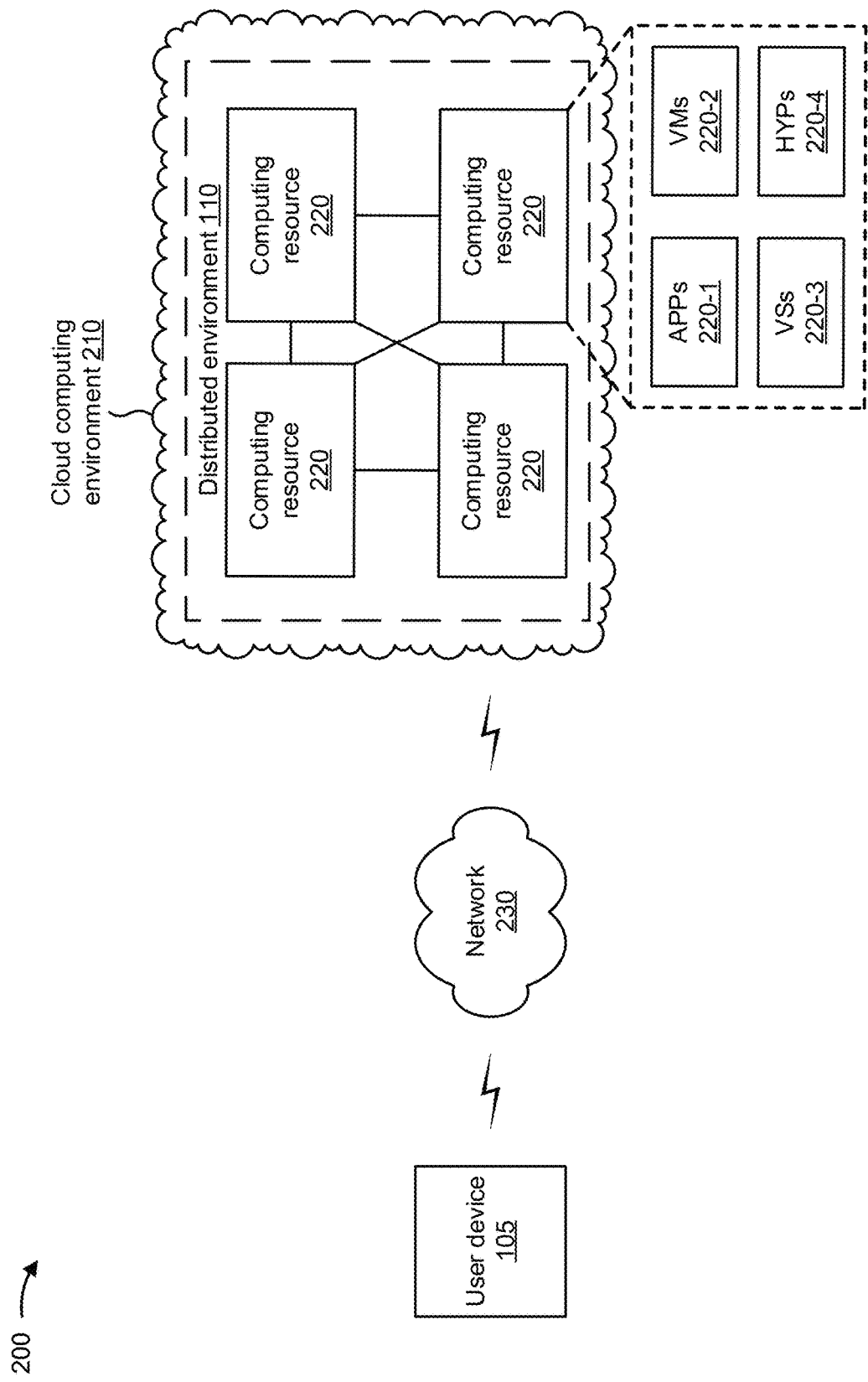
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, distributed environment 110, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to distributed environment 110.

Distributed environment 110 includes one or more devices that provide a compare and swap platform for sequence number generation in a cloud computing environment. In some implementations, distributed environment 110 may be designed to be modular such that certain software components may be swapped in or out depending on a particular need. As such, distributed environment 110 may be easily and/or quickly reconfigured for different uses. In some implementations, distributed environment 110 may receive information from and/or transmit information to one or more user devices 105.

In some implementations, as shown, distributed environment 110 may be hosted in a cloud computing environment 210. Notably, while implementations described herein describe distributed environment 110 as being hosted in cloud computing environment 210, in some implementations, distributed environment 110 may not be cloud-based (i.e., may be implemented outside of a cloud computing environment) or may be partially cloud-based.

Cloud computing environment 210 includes an environment that hosts distributed environment 110. Cloud computing environment 210 may provide computation, software, data access, storage, etc., services that do not require end-user knowledge of a physical location and configuration of system(s) and/or device(s) that hosts distributed environment 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host distributed environment 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with distributed environment 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS").

A process virtual machine may execute a single program and may support a single process. In some implementations, virtual machine 220-2 may execute on behalf of a user (e.g., a user of user device 105 or an operator of distributed environment 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
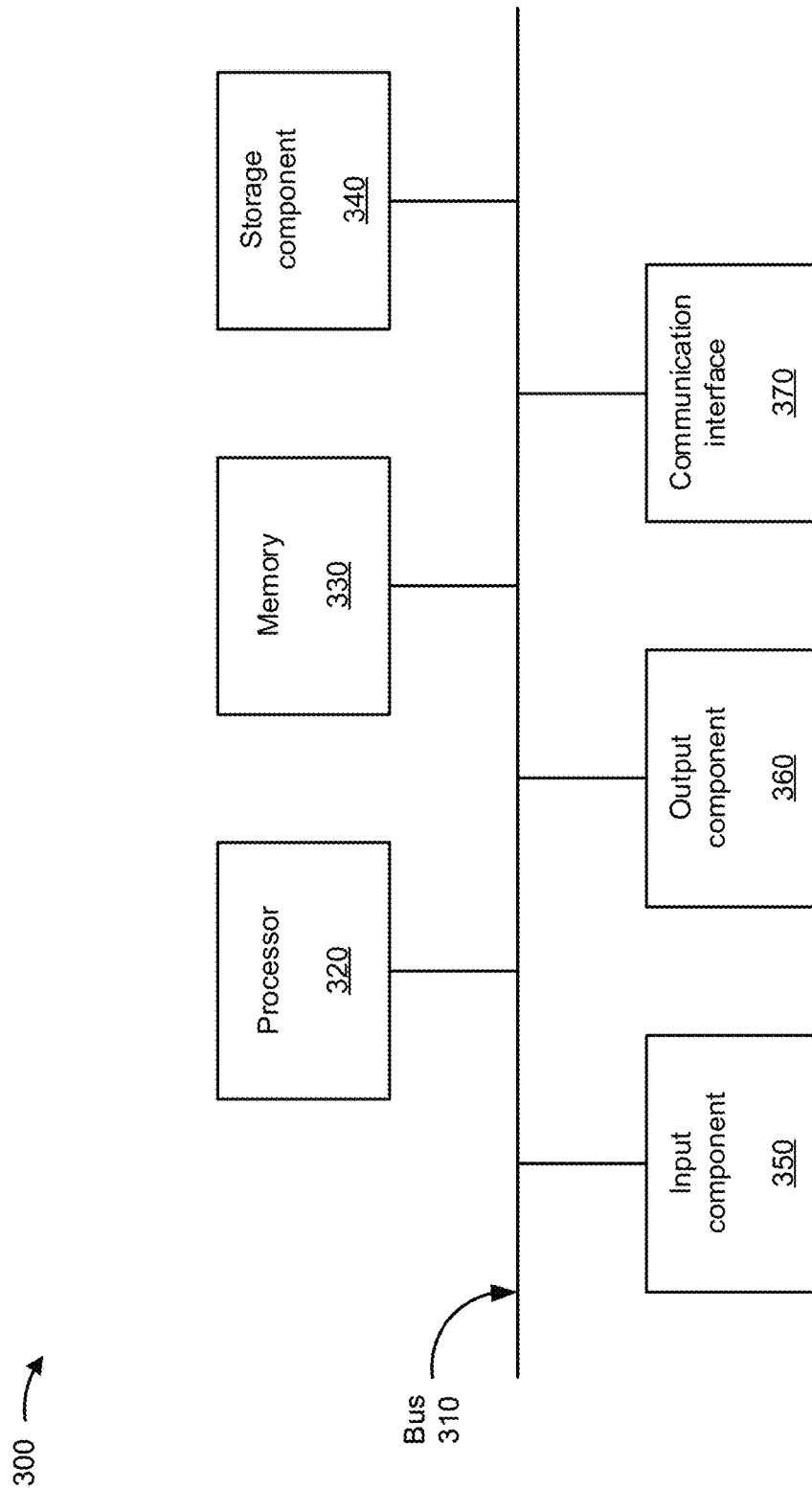
FIG. 3 is a diagram of example components of one or more devices of FIG. 2.

FIG. 3 is a diagram of example components of a device 300. Device 300 may correspond to user device 105, distributed environment 110, and/or computing resource 220. In some implementations, user device 105, distributed environment 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
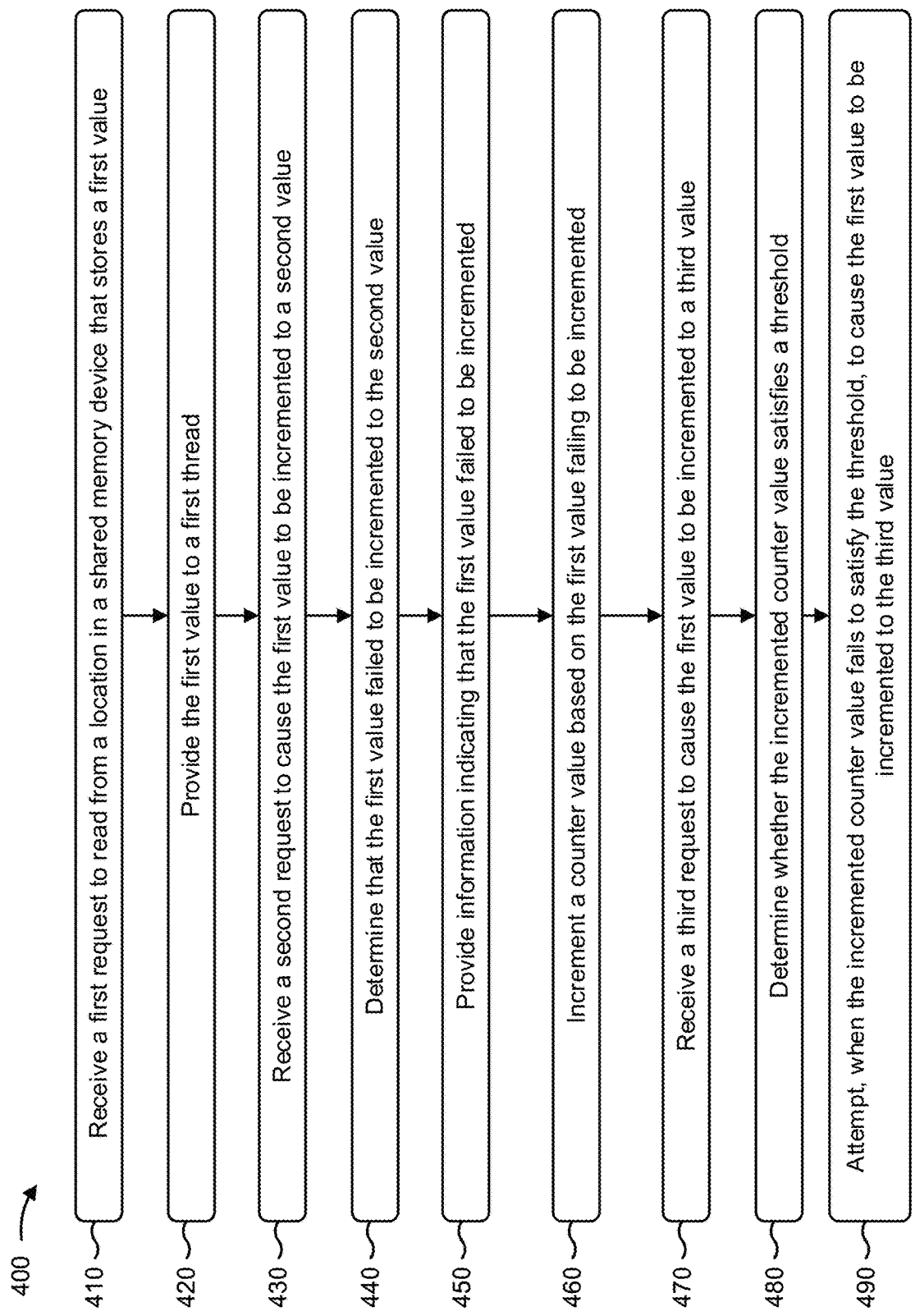
FIG. 4 is a flow chart of an example process for providing a compare and swap platform for sequence number generation in a cloud computing environment.

FIG. 4 is a flow chart of an example process 400 for providing a compare and swap platform for sequence number generation in a cloud computing environment. In some implementations, one or more process blocks of FIG. 4 may be performed by a device (e.g., a shared memory device of distributed environment 110). In some implementations, one or more process blocks of FIG. 4 may be performed by another device or a group of devices separate from or including the device, such as a user device (e.g., user device 105).

As shown in FIG. 4, process 400 may include receiving, from a first thread of a plurality of threads, a first request to read from a location in a device that stores a first value at a time of receipt of the first request (block 410). For example, the device (e.g., using computing resource 220, processor 320, communication interface 370, and/or the like) may receive, from a first thread of a plurality of threads, a first request to read from a location in the device that stores a first value at a time of receipt of the first request. In some implementations, the plurality of threads may be associated with an application.

As further shown in FIG. 4, process 400 may include providing, to the first thread, the first value based on receiving the first request (block 420). For example, the device (e.g., using computing resource 220, processor 320, memory 330, communication interface 370, and/or the like) may provide, to the first thread, the first value based on receiving the first request, as described above.

As further shown in FIG. 4, process 400 may include receiving, from the first thread, a second request to cause the first value, stored at the location in the device, to be incremented to a second value (block 430). For example, the device (e.g., using computing resource 220, processor 320, communication interface 370, and/or the like) may receive, from the first thread, a second request to cause the first value, stored at the location in the device, to be incremented to a second value, as described above.

As further shown in FIG. 4, process 400 may include determining that the first value failed to be incremented to the second value (block 440). For example, the device (e.g., using computing resource 220, processor 320, storage component 340, and/or the like) may determine that the first value failed to be incremented to the second value, as described above.

As further shown in FIG. 4, process 400 may include providing, to the first thread, information indicating that the first value failed to be incremented to the second value (block 450). For example, the device (e.g., using computing resource 220, processor 320, storage component 340, communication interface 370, and/or the like) may provide, to the first thread, information indicating that the first value failed to be incremented to the second value, as described above.

As further shown in FIG. 4, process 400 may include incrementing a counter value, based on the first value failing to be incremented to the second value, to generate an incremented counter value (block 460). For example, the device (e.g., using computing resource 220, processor 320, memory 330, and/or the like) may increment a counter value, based on the first value failing to be incremented to the second value, to generate an incremented counter value, as described above.

As further shown in FIG. 4, process 400 may include receiving, from the first thread, a third request to cause the first value, stored at the location in the device, to be incremented to a third value (block 470). For example, the device (e.g., using computing resource 220, processor 320, communication interface 370, and/or the like) may receive, from the first thread, a third request to cause the first value, stored at the location in the device, to be incremented to a third value, as described above.

As further shown in FIG. 4, process 400 may include determining, based on receiving the third request, whether the incremented counter value satisfies a threshold (block 480). For example, the device (e.g., using computing resource 220, processor 320, storage component 340, and/or the like) may determine, based on receiving the third request, whether the incremented counter value satisfies a threshold, as described above. In some implementations, the threshold may include a maximum quantity of attempts to be permitted by a current thread to increment a value stored at the location in the device. In some implementations, the threshold may be configurable based on a contention rate associated with the plurality of threads and a quantity of the plurality of threads. In some implementations, the threshold may increase when a contention rate associated with the plurality of threads increases and a quantity of the plurality of threads decreases. In some implementations, the threshold may be configured to decrease when a contention rate associated with the plurality of threads decreases and a quantity of the plurality of threads increases.

As further shown in FIG. 4, process 400 may include attempting, when the incremented counter value fails to satisfy the threshold, to cause the first value, stored at the location in the device, to be incremented to the third value (block 490). For example, the device (e.g., using computing resource 220, processor 320, memory 330, storage component 340, and/or the like) may attempt, when the incremented counter value fails to satisfy the threshold, to cause the first value, stored at the location in the device, to be incremented to the third value, as described above.

Process 400 may include additional implementations, such as any single implementation or any combination of implementations described below and/or in connection with one or more other processes described elsewhere herein.

In some implementations, process 400 may include receiving, from the first thread and after the incremented counter value satisfies the threshold, a fourth request to read from the location in the device.

In some implementations, process 400 may include receiving, from a second thread of the plurality of threads, a fourth request to read from the location in the device; providing, to the second thread, the first value based on receiving the fourth request; causing, after receiving the fourth request, the first value, stored at the location in the device, to be incremented to the third value and stored at the location; receiving, from the second thread, a fifth request to cause the first value, stored at the location in the device, to be incremented to the second value; determining that the first value failed to be incremented to the second value; and providing, to the second thread, the information indicating that the first value failed to be incremented to the second value.

In some implementations, process 400 may include receiving, from the second thread, a sixth request to cause the third value, stored at the location in the device, to be incremented to a fourth value; and attempting to cause the third value, stored at the location in the device, to be incremented to the fourth value.

In some implementations, process 400 may include causing, when the incremented counter value fails to satisfy the threshold, the first value, stored at the location in the device, to be incremented to the third value and stored at the location of the device.

In some implementations, process 400 may include receiving, from a second thread of a plurality of threads, a fifth request to read from the location in the device; providing, to the second thread, the first value based on receiving the fifth request; receiving, from the second thread, a sixth request to cause the first value, stored at the location in the device, to be incremented to the second value; determining that the first value failed to be incremented to the second value; and providing, to the second thread, the information indicating that the first value failed to be incremented to the second value.

In some implementations, process 400 may include incrementing the counter value, based on the first value failing to be incremented to the second value, to generate a further incremented counter value; receiving, from the second thread, a seventh request to cause the first value, stored at the location in the device, to be incremented to a fourth value; determining whether the further incremented counter value satisfies the threshold; and attempting, when the further incremented counter value fails to satisfy the threshold, to cause the first value, stored at the location in the device, to be incremented to the fourth value.

In some implementations, process 400 may include receiving, from the second thread and after the further incremented counter value satisfies the threshold, an eighth request to read from the location in the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a shared memory device and from user devices, a plurality of threads associated with an application,
      wherein the shared memory device provides a compare and swap platform for sequence number generation in a cloud computing environment;
   receiving, by the shared memory device and from a first thread of the plurality of threads, a first request to read from a location in the shared memory device,
      wherein the location stores a first value of a sequence number associated with a sequence of execution of operations performed by the plurality of threads;
   providing, by the shared memory device and to the first thread, the first value based on receiving the first request,
      wherein the first thread utilizes the first value as a last known value of the sequence number when determining a next-expected value of the sequence number;
   receiving, by the shared memory device and from the first thread, a second request to cause the first value, stored at the location in the shared memory device, to be incremented to a second value;
   determining, by the shared memory device, that the first value failed to be incremented to the second value based on determining that a current value of the sequence number is inconsistent with the first value based on a second thread of the plurality of threads incrementing the sequence number to the second value subsequent to the first value being provided to the first thread;

providing, by the shared memory device and to the first thread, information indicating that the first value failed to be incremented to the second value;
incrementing, by the shared memory device, a counter value, based on the first value failing to be incremented to the second value based on the second request, to generate an incremented counter value;
receiving, by the shared memory device and from the first thread, a third request to cause the second value, stored at the location in the shared memory device, to be incremented to a third value;
determining, by the shared memory device and based on receiving the third request from the first thread, whether the incremented counter value satisfies a threshold,
wherein the threshold represents a maximum quantity of attempts to be permitted by a current thread to increment a value of the sequence number stored at the location in the shared memory device without having to read from the location of the shared memory device;
attempting, in response to the third request from the first thread by the shared memory device and based on the determination that the incremented counter value fails to satisfy the threshold, to cause the first value to be incremented to the third value to prevent the first thread from accessing an incorrect value from the shared memory device;
providing, by the shared memory device and to the first thread, information indicating that the first value failed to be incremented to the third value, when the attempt fails to increment the first value to the third value;
incrementing, by the shared memory device, the counter value by one based on the first value failing to be incremented to the third value;
receiving, by the shared memory device and from the first thread and when the incremented counter value satisfies the threshold, a fourth request to read the current value of the sequence number from the location in the shared memory device; and
providing, by the shared memory device, the current value of the sequence number to the first thread based on receiving the fourth request.

2. The method of claim 1, further comprising:
receiving, from a third thread of the plurality of threads, a fifth request to read from the location in the shared memory device;
providing, to the third thread, the first value based on receiving the fifth request;
causing, after receiving the fifth request, the first value, stored at the location in the shared memory device, to be incremented to the third value and stored at the location;
receiving, from the third thread, a sixth request to cause the first value, stored at the location in the shared memory device, to be incremented to the second value;
determining that the first value failed to be incremented to the second value; and
providing, to the third thread, the information indicating that the first value failed to be incremented to the second value.

3. The method of claim 2, further comprising:
receiving, from the third thread, a seventh request to cause the third value, stored at the location in the shared memory device, to be incremented to a fourth value; and
attempting to cause the third value, stored at the location in the shared memory device, to be incremented to the fourth value.

4. The method of claim 1, wherein the threshold is configurable based on a contention rate associated with the plurality of threads and a quantity of the plurality of threads.

5. The method of claim 1, wherein the threshold increases when a contention rate associated with the plurality of threads increases and a quantity of the plurality of threads decreases.

6. The method of claim 1, wherein the incremented counter value represents a quantity of attempts made by the first thread to increment the sequence number.

7. A device, comprising:
one or more memories; and
one or more processors, communicatively coupled to the one or more memories, configured to:
receive, from a first thread of a plurality of threads, a first request to read from a location in the device,
wherein the device provides a compare and swap platform for sequence number generation in a cloud computing environment, and
wherein the location stores a first value as a current value of a sequence number associated with a sequence of execution of operations performed by the plurality of threads,
wherein the first thread utilizes the first value as a last known value of the sequence number when determining a next-expected value of the sequence number;
provide, to the first thread, the first value based on receiving the first request;
receive, from the first thread, a second request to cause the first value, stored at the location in the device, to be incremented to a second value;
determine that the first value failed to be incremented to the second value based on determining that the current value of the sequence number is inconsistent with the first value based on a second thread of the plurality of threads incrementing the sequence to the second value subsequent to the first value being provided to the first thread;
provide, to the first thread, information indicating that the first value failed to be incremented to the second value;
increment a counter value, based on the first value failing to be incremented to the second value, to generate an incremented counter value;
receive, from the first thread, a third request to cause the second value, stored at the location in the device, to be incremented to a third value;
determine, based on receiving the third request, whether the incremented counter value satisfies a threshold,
wherein the threshold represents a maximum quantity of attempts to be permitted by a current thread to increment a value of the sequence number stored at the location in the device; and
selectively:
attempt, based on the third request and when the incremented counter value fails to satisfy the threshold, to cause the first value to be incremented to the third value to prevent the first thread from accessing an incorrect value from the location;
provide, to the first thread, information indicating that the first value failed to be incremented to the third value, when the attempt fails to increment the first value to the third value;
increment, the counter value by one, based on the first value failing to be incremented to the third value;
receive, from the first thread and after the incremented counter value satisfies the threshold, a fourth request to read the current value of the sequence number from the location in the device; and
provide, the current value of the sequence number to the first thread based on receiving the fourth request.

8. The device of claim 7, wherein the threshold is configured to decrease when a contention rate associated with the plurality of threads decreases and a quantity of the plurality of threads increases.

9. The device of claim 7, wherein the one or more processors are further configured to:
cause, when the incremented counter value fails to satisfy the threshold, the first value, stored at the location in the device, to be incremented to the third value and stored at the location of the device.

10. The device of claim 7, wherein the one or more processors are further configured to:
receive, from a third thread of the plurality of threads, a fifth request to read from the location in the device;
provide, to the third thread, the first value based on receiving the fifth request;
receive, from the third thread, a sixth request to cause the first value, stored at the location in the device, to be incremented to the second value;
determine that the first value failed to be incremented to the second value; and
provide, to the third thread, the information indicating that the first value failed to be incremented to the second value.

11. The device of claim 10, wherein the one or more processors are further configured to:
increment the counter value, based on the first value failing to be incremented to the second value, to generate a further incremented counter value;
receive, from the third thread, a seventh request to cause the first value, stored at the location in the device, to be incremented to a fourth value;
determine whether the further incremented counter value satisfies the threshold; and
attempt, when the further incremented counter value fails to satisfy the threshold, to cause the first value, stored at the location in the device, to be incremented to the fourth value.

12. The device of claim 11, wherein the one or more processors are further configured to:
receive, from the third thread and after the further incremented counter value satisfies the threshold, an eighth request to read from the location in the device.

13. The device of claim 7, wherein the plurality of threads are associated with an application.

14. The device of claim 7, wherein the incremented counter value represents a quantity of attempts made by the first thread to increment the sequence number.

15. A non-transitory computer-readable medium storing instructions for comparing sequence numbers in a cloud computing environment, the instructions comprising:
one or more instructions that, when executed by one or more processors of a shared memory device, cause the one or more processors to:
receive, from a first thread of a plurality of threads, a first request to read from a location in the shared memory device,
wherein the shared memory device provides a compare and swap platform for sequence number generation in the cloud computing environment, and
wherein the location stores a first value as a current value of a sequence number associated with a sequence of execution of operations performed by the plurality of threads,
wherein the first thread utilizes the first value as a last known value of the sequence number when determining a next-expected value of the sequence number;
provide, to the first thread, the first value based on receiving the first request;
receive, from the first thread, a second request to cause the first value, stored at the location in the shared memory device, to be incremented to a second value;
determine that the first value failed to be incremented to the second value based on determining that the current value of the sequence number is inconsistent with the first value based on a second thread of the plurality of threads incrementing the sequence number to the second value subsequent to the first value being provided to the first thread;
provide, to the first thread, information indicating that the first value failed to be incremented to the second value;
increment a counter value, based on the first value failing to be incremented to the second value, to generate an incremented counter value;
receive, from the first thread, a third request to cause the first value, stored at the location in the shared memory device, to be incremented to a third value;
determine, based on receiving the third request from the first thread, whether the incremented counter value satisfies a threshold,
wherein the threshold represents a maximum quantity of attempts to be permitted by a current thread to increment a value of the sequence number stored at the location in the shared memory device;
attempt, when the incremented counter value fails to satisfy the threshold, to cause the first value, stored at the location in the shared memory device, to be incremented to the third value to prevent the first thread from accessing an incorrect value from the shared memory device;
provide to the first thread, information indicating that the first value failed to be incremented to the third value, when the attempt fails to increment the first value to the third value;
increment, the counter value by one, based on the first value failing to be incremented to the third value;
receive, from the first thread and when the incremented counter value satisfies the threshold, a fourth request to read the current value of the sequence number from the location in the shared memory device; and
provide, the current value of the sequence number to the first thread based on receiving the fourth request.

16. The non-transitory computer-readable medium of claim 15, wherein the instructions further comprise:
one or more instructions that, when executed by the one or more processors, cause the one or more processors to:

receive, from a third thread of the plurality of threads, a fifth request to read from the location in the shared memory device;

provide, to the third thread and prior to causing the first value to be incremented to the third value, the first value based on receiving the fifth request;

receive, from the third thread, a sixth request to cause the first value, stored at the location in the shared memory device, to be incremented to the second value;

determine that the first value failed to be incremented to the second value; and provide, to the third thread, the information indicating that the first value failed to be incremented to the second value.

17. The non-transitory computer-readable medium of claim 16, wherein the instructions further comprise:

one or more instructions that, when executed by the one or more processors, cause the one or more processors to:

receive, from the third thread, a seventh request to cause the third value, stored at the location in the shared memory device, to be incremented to a fourth value; and attempt to cause the third value, stored at the location in the shared memory device, to be incremented to the fourth value.

18. The non-transitory computer-readable medium of claim 15, wherein the threshold is configurable based on a contention rate associated with the plurality of threads and a quantity of the plurality of threads.

19. The non-transitory computer-readable medium of claim 15, wherein the threshold is configured to increase when a contention rate associated with the plurality of threads increases and the quantity of the plurality of threads decreases, and wherein the threshold is configured to decrease when the contention rate associated with the plurality of threads decreases and the quantity of the plurality of threads increases.

20. The non-transitory computer-readable medium of claim 15, wherein the incremented counter value represents a quantity of attempts made by the first thread to increment the sequence number.

\* \* \* \* \*